T. J. DEAN,

Assignor to L. M. & M. Rumsey.

TUBE-WELL.

No. 7,721. Reissued June 5, 1877.

ATTEST:

James T. Harris
W. C. Rumsey

INVENTOR:

T. J. Dean

UNITED STATES PATENT OFFICE.

T. J. DEAN, OF ST. LOUIS, MISSOURI, ASSIGNOR TO LEWIS M. RUMSEY AND MOSES RUMSEY.

IMPROVEMENT IN TUBE-WELLS.

Specification forming part of Letters Patent No. 71,144, dated November 19, 1867; reissue No. 7,721, dated June 5, 1877; application filed May 2, 1877.

*To all whom it may concern:*

Be it known that I, T. J. DEAN, of St. Louis, in the county of St. Louis and State of Missouri, have made certain new and useful Improvements in Tube-Wells; and I do hereby declare the following to be a full and clear description thereof, reference being had to the accompanying drawings, and to the letters of reference marked thereon.

The object of this invention is to construct a well in such a manner as to free the water drawn from it from all mechanical impurities by filtering before it is drawn from the well. This is most readily accomplished by using the driven wells—that is, the wells constructed by driving a pipe, having its lower end perforated, down to the water-bearing strata in the earth. When this kind of a well is used I surround the lower perforated end of the well-tube with a screen or strainer of wire cloth or gauze. Surrounding or covering this wire-gauze screen I place my filtering material, which I also cover with a wire-gauze screen or strainer. In order to protect the screen from being injured or torn while driving the well-tube into or withdrawing it from the earth, I cover it with a perforated metal plate or tube of any suitable material, thickness, perforations, or length. When the well is dug or bored the outside perforated metal shield is not important. When the well is made by driving the tube this shield is important.

The invention will be more fully understood by reference to the following description, which will enable those skilled in the art to make and use my improved tube well.

Figure 1:
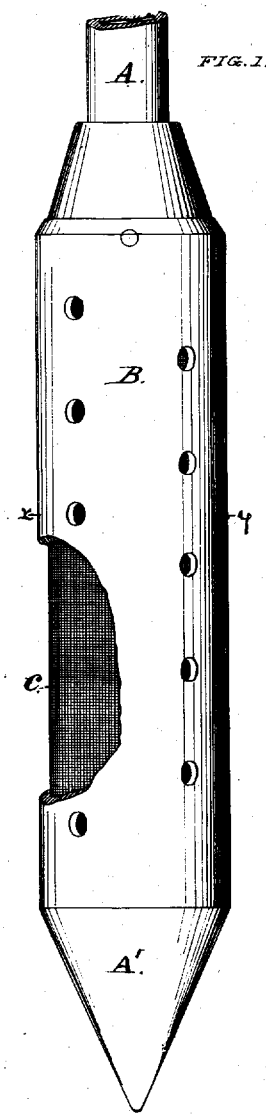
Figure 3:
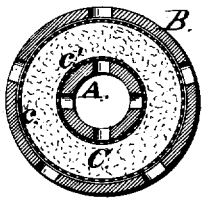
Figure 2:
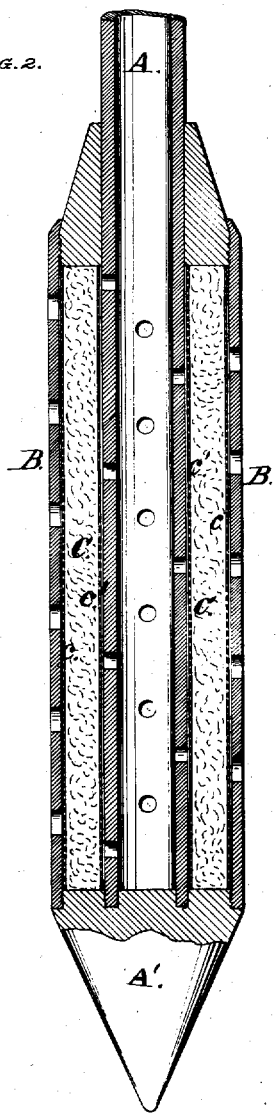

Figure 1 of the drawings is a side elevation of one of my improved well-tubes with part of the outer casing broken away, showing the outer sheet of gauze. Fig. 2 is a horizontal section taken on the line of *x y* of Fig. 1. Fig. 3 is a sectional elevation of the same.

The tube A has a solid pointed end, A′, in the same manner that the solid points are affixed to the ordinary tubes of the driven well, except, in this instance, the point A′ will be as much greater in diameter than the tube A as the screen, filtering material, and outside casing increases the tube A in diameter. The casing B is firmly affixed to the tops of the point A′ or bottom of the tube A, and should be of sufficient length to entirely cover and protect the wire-gauze. The casing B is perforated with numerous small holes of any suitable number or size. It will inclose between it and the tube A an annular chamber, C, of sufficient width to hold the screens *c c′* and the filtering material that may be used. The inclosed end of the tube A is pierced with holes of sufficient number and size. In the annular chamber C, which is thus formed, are to be placed the two concentric strainers *c c′*, the strainer *c* being placed close to the inside of the casing B, and the strainer *c′* close to outside of the tube A. Between these strainers thus located is to be introduced any suitable filtering material.

Having described my invention, what I claim is—

1. A tube-well, its lower section consisting of two concentric perforated tubes, one wire-gauze tube surrounding the interior perforated tube, and another lining the exterior perforated tube, a body of filtering material being placed between the two tubes of gauze, substantially as shown and described.

2. In combination with the perforated end of a driven well-tube, a filtering device and a perforated casing, surrounding both the perforated end of the well-tube and the filtering device, for the purpose specified.

T. J. DEAN.

Attest:

JAMES T. FARRIS,
W. C. RUMSEY.